(12) United States Patent
Riley et al.

(10) Patent No.: US 12,322,226 B2
(45) Date of Patent: Jun. 3, 2025

(54) BATTERY PACK SYSTEM

(71) Applicant: Rivian IP Holdings, LLC, Irvine, CA (US)

(72) Inventors: John W. Riley, Huntington Beach, CA (US); Huyen Hoa Tran, Foothill Ranch, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 575 days.

(21) Appl. No.: 17/736,479

(22) Filed: May 4, 2022

(65) Prior Publication Data
US 2023/0360451 A1 Nov. 9, 2023

(51) Int. Cl.
*G07C 5/08* (2006.01)
*B60L 50/64* (2019.01)
(Continued)

(52) U.S. Cl.
CPC ............ *G07C 5/0825* (2013.01); *B60L 50/64* (2019.02); *B60L 58/12* (2019.02); *B60L 58/16* (2019.02);
(Continued)

(58) Field of Classification Search
CPC ....... G07C 5/0825; B60L 50/64; B60L 58/12; B60L 58/16; B60L 2240/545; B60L 2240/547; B60L 2250/16; B60L 3/12; H01M 10/425; H01M 10/482; H01M 10/486; H01M 2010/4271; H01M 2010/4278; H01M 2220/20; H01M 10/4257; G06F 8/44
(Continued)

(56) References Cited

U.S. PATENT DOCUMENTS 10,938,221 B1 * 3/2021 Tenorio ................. H02J 7/0048
11,095,140 B1 * 8/2021 Chen ..................... H02J 7/0048
(Continued)

FOREIGN PATENT DOCUMENTS

EP 3115251 A1 * 1/2017 ................ B60L 3/12
WO WO-2010033517 A2 * 3/2010 .......... B60L 11/1816
(Continued)

OTHER PUBLICATIONS

Aptiv, "What Is HVIL?," retrieved from https://www.aptiv.com/en/insights/article/what-is-hvil, 3 pages (2021).
(Continued)

*Primary Examiner* — M Baye Diao
(74) *Attorney, Agent, or Firm* — Foley & Lardner LLP

(57) ABSTRACT

At least one aspect is direct to a system. The system can include a data processing system including one or more processors, coupled to memory. The data processing system can receive a data packet from a battery pack, the data packet indicating a characteristic of the battery pack. The data processing system can select, based on an identifier associated with the battery pack, a decoding scheme associated with the identifier. The data processing system can decode the data packet with the decoding scheme to generate a message. The data processing system can cause a computing device to display the message indicating the characteristic of the battery pack.

20 Claims, 7 Drawing Sheets

(51) Int. Cl.
*B60L 58/12* (2019.01)
*B60L 58/16* (2019.01)
*H01M 10/42* (2006.01)
*H01M 10/48* (2006.01)

(52) U.S. Cl.
CPC ....... *H01M 10/425* (2013.01); *H01M 10/482* (2013.01); *H01M 10/486* (2013.01); *B60L 2240/545* (2013.01); *B60L 2240/547* (2013.01); *H01M 2010/4271* (2013.01); *H01M 2010/4278* (2013.01); *H01M 2220/20* (2013.01)

(58) Field of Classification Search
USPC ........................................................ 320/106
See application file for complete search history.

(56) References Cited

U.S. PATENT DOCUMENTS

| | | | |
|---|---|---|---|
| 11,245,268 B1 * | 2/2022 | Trippel | H02J 7/0013 |
| 11,417,927 B2 * | 8/2022 | Butterfield | H01M 50/204 |
| 11,443,569 B1 * | 9/2022 | Churchill | G07C 5/0808 |
| 11,552,478 B2 * | 1/2023 | Huot-Marchand | H04L 25/4919 |
| 11,757,162 B1 * | 9/2023 | Lohe | B64D 27/24 429/61 |
| 11,975,630 B2 * | 5/2024 | Balasubramanian | G05B 17/02 |
| 11,983,971 B2 * | 5/2024 | Churchill | B60L 58/26 |
| 2017/0158059 A1 * | 6/2017 | Dai | B32B 7/04 |
| 2017/0246963 A1 * | 8/2017 | Lee | H01M 10/425 |
| 2021/0050734 A1 * | 2/2021 | Huot-Marchand | H04L 25/4919 |
| 2022/0029429 A1 * | 1/2022 | Trippel | H02J 7/0014 |
| 2022/0082627 A1 * | 3/2022 | O'Mahony | G01R 31/389 |
| 2022/0158255 A1 * | 5/2022 | Choi | H01M 10/486 |

FOREIGN PATENT DOCUMENTS

| | | | | |
|---|---|---|---|---|
| WO | WO-2021188987 A1 * | 9/2021 | | B60L 58/12 |
| WO | WO-2023155071 A1 * | 8/2023 | | H01M 10/0525 |

OTHER PUBLICATIONS

Jenkins, "A closer look at contactors," Charged Electric Vehicles Magazine, retrieved from https://chargedevs.com/features/a-closer-look-at-contactors/, 23 pages (2018).

* cited by examiner

FIG. 5

BATTERY PACK SYSTEM

INTRODUCTION

A vehicle, such as an electric vehicle, can be powered by batteries. The vehicle can include components that operate the vehicle based on power provided by the batteries.

SUMMARY

A battery pack of an electric vehicle can include a battery management system that stores characteristics of battery modules of the battery pack. The characteristics can include data such as temperature of the battery cells, voltage of the battery cells, or states of the battery cells. Battery packs can encode characteristics in their data packets differently. The battery packs can encode the data differently based on the different number or type of cells or other components of the battery pack. The system can store multiple decoding files or multiple user interface formats. The decoding files can each define a decoding scheme. Each decoding file can be associated with an identifier of a battery pack that the decoding file can be implemented for. Based on the identifier, the system can select the appropriate decoding file, use the decoding file to decode the data packet to generate a message, and cause a display to display the message. Each user interface format can be associated with an identifier of the battery pack. The system can select the appropriate user interface format and populate the user interface format with the message resulting from decoding the data packet. This allows the system to adapt to a variety of different battery packs when different battery packs are connected with the system.

At least one aspect is directed to a system including a data processing system including one or more processors, coupled to memory. The data processing system can receive a data packet associated with a battery pack. The data packet can indicate a characteristic of the battery pack. The data processing system can select, based on an identifier associated with the battery pack, a decoding scheme associated with the identifier. The data processing system can decode the data packet with the decoding scheme to generate a message. The data processing system can cause a computing device to display the message indicating the characteristic of the battery pack.

At least one aspect is directed to a method. The method can include an act of receiving, by a data processing system including one or more processors coupled to memory, a data packet associated with a battery pack, the data packet indicating a characteristic of the battery pack. The method can include an act of selecting, by the data processing system, based on an identifier associated with the battery pack, a decoding scheme associated with the identifier. The method can include an act of decoding, by the data processing system, the data packet with the decoding scheme to generate a message. The method can include an act of causing, by the data processing system, a computing device to display the message indicating the characteristic of the battery pack.

At least one aspect is directed to a battery pack system. The battery pack system can include a battery cell. The battery pack system can include a battery management system. The battery management system can encode a data packet indicating a characteristic of the battery cell. The battery management system can transmit the data packet and an identifier associated with the battery management system to a data processing system. The data processing system can decode the data packet based on the identifier to generate a message and cause a computing device to display the message.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 depicts an example user interface.

DETAILED DESCRIPTION

Figure 1:
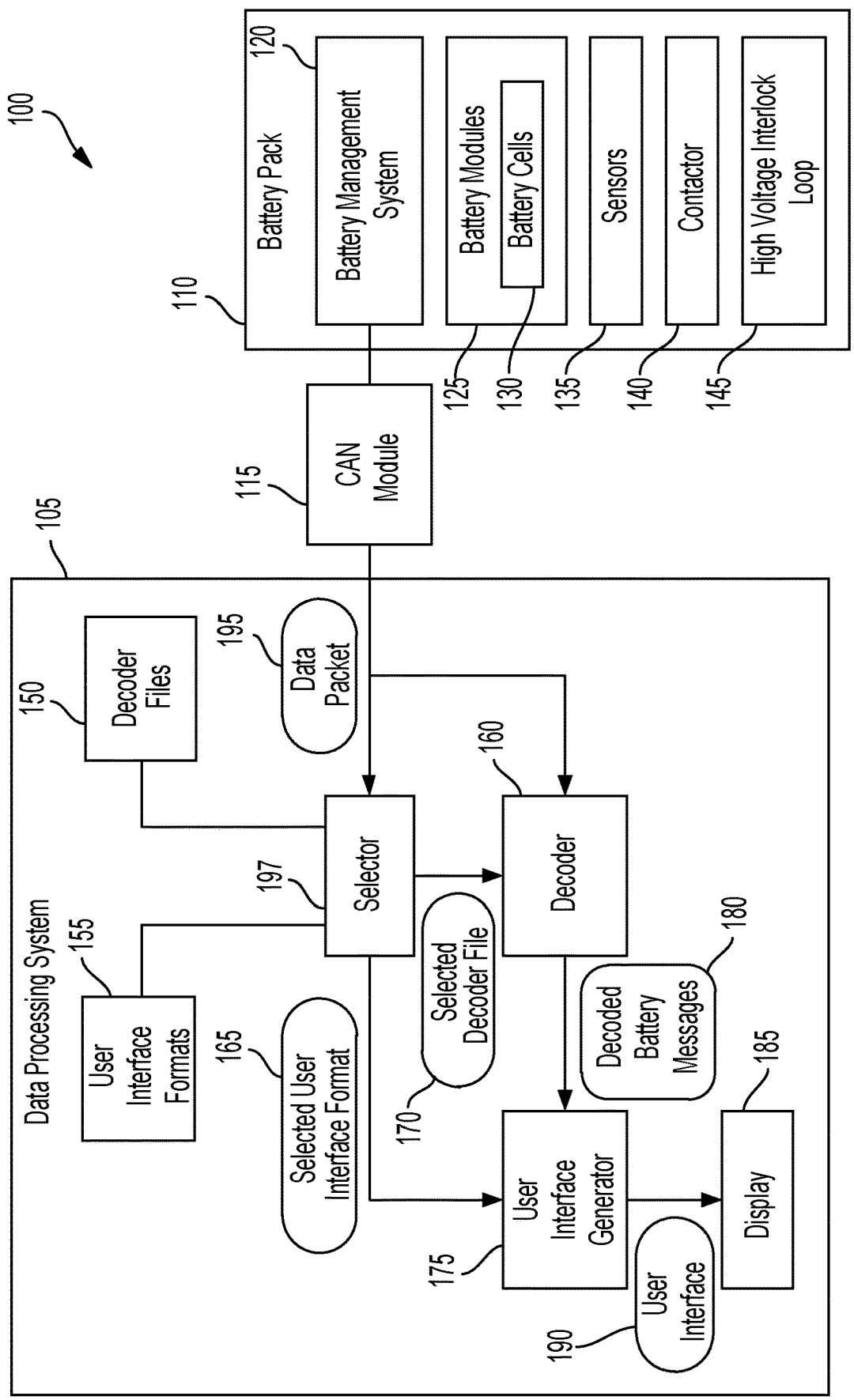
FIG. 1 depicts an example system including a data processing system and a battery pack.

Following below are more detailed descriptions of various concepts related to, and implementations of, methods, apparatuses, and systems of determining characteristics of a battery pack system, for example a battery pack system of an electric or hybrid vehicle. The various concepts introduced above and discussed in greater detail below may be implemented in any of numerous ways.

This disclosure is generally directed to a system that decodes data packets received from battery systems of electric or hybrid vehicles. A battery pack of an electric or hybrid vehicle can include a battery management system that stores characteristics of battery modules of the battery pack. The characteristics can include data such as temperature of the battery cells, voltage of the battery cells, or states of the battery cells. The characteristics stored by the battery management system can include data associated with other components of the battery pack, for example, a contactor of the battery pack, a high voltage interlock loop of the battery pack, temperature sensors of the battery pack, voltage sensors of the battery pack, or gas sensors of the battery pack. The system can select a decoding scheme to decode a data packet received from the battery pack. The system can select the decoding scheme based on an identifier associated with the battery pack. The system can generate a message by decoding the data packet with the decoding scheme. Furthermore, the system can select a format for displaying the message of the battery pack based on the identifier. Based on the format, the system can generate a user interface based on the message and can cause the user interface to be displayed on a display of a computing device.

Battery packs can encode characteristics in their data packets differently. The battery packs can encode the data differently based on the different number of cells or other components of the battery pack. The software executed by the battery management system can also change how the battery management system encodes the data. These variations in encoding across battery packs create a technical problem. While a system may be able to decode data packets of one battery pack, the system may not be able to decode data packets of another battery pack since the two battery packs can encode their data differently. Furthermore, the system can include a user interface that can display decoded data packets for one battery pack. However, this user interface may not be appropriate for displaying decoded data packets of another battery pack because the data packets may include different types or amounts of data. The system can include a configuration input. A user or system can provide the configuration input to the user to define decoding of data received from the battery pack. However, this may be a significant amount of work, e.g., hundreds or thousands of signals may need to be configured.

To solve these and other technical problems, the technical solution described herein can store multiple decoding files or multiple user interface formats. The decoding files can each define a decoding scheme. Each decoding file can be associated with an identifier of a battery pack. The decoding file can decode data packets of the battery pack that the decoding file is linked to via the identifier. Based on the identifier, the system can select the appropriate decoding file, use the decoding file to decode the data packet to generate a message, and cause a display to display the message. Each user interface format can be associated with an identifier of the battery pack. The system can select the appropriate user interface format and populate the user interface format with the message resulting from decoding the data packet. This allows the system to adapt to a variety of different battery packs when different battery packs are connected with the system. Based on the decoder file, the system can translate data packets to determine battery pack characteristics in a quick and computationally efficient manner. A system that translates data of a battery pack that does not utilize a decoder file can use multiple configurations, run additional processes, and perform other translation tasks that utilize a significant amount of processing resources, consume a significant amount of power, and take a significantly long time. The system that utilizes the decoder file translates the data packets quicker while consuming less processor resources, memory resources, and less power.

FIG. 1 depicts an example system 100 including at least one data processing system 105 and at least one battery pack 110. The data processing system 105 can include one or more processors coupled to memory. The data processing system 105 can be a computing system such as a laptop, a tablet, a smartphone, a desktop computer, a cloud-computing system, a server system, or any other type of mobile or stationary computing system. The system 100 can include at least one controller area network (CAN) module 115. The CAN module 115 can be, include, or be part of a component of the data processing system 105 or of the battery pack 110. The data processing system 105 can connect with the CAN module 115. For example, the data processing system can implement a Universal Serial Bus (USB) connection that connects the data processing system 105 with the CAN module 115. The data processing system 105 can implement a USB host and the CAN module 115 can implement a USB endpoint. A USB connector of the CAN module 115 can be inserted into a USB connector of the data processing system 105 to connect the data processing system 105 with the CAN module 115.

The CAN module 115 can connect to the battery pack 110. The battery pack 110 can include at least one battery management system 120. The battery management system 120 of the battery pack 110 can implement CAN communication. The CAN communication can be performed over a CAN bus. The CAN module 115 can connect with the battery management system 120 via the CAN bus to receive data from the battery management system 120, e.g., at least one data packet 195. The CAN module 115 can communicate the data received over the CAN bus to the data processing system 105 via a different communication protocol, e.g., USB, serial peripheral interface (SPI), inter-integrated circuit (I2C), universal asynchronous receiver-transmitter (UART), universal synchronous asynchronous receiver-transmitter (USART), PS/2.

The data processing system 105 can receive the data packet 195 from the battery pack 110. The data processing system 105 can receive the data packet 195 from the battery pack 110 via the CAN module 115. The data packet 195 can include one or multiple characteristics of the battery pack 110. For example, the battery management system 120 can collect characteristics of the battery pack 110. The battery management system 120 can generate the data packet 195 to include the characteristics of the battery pack 110. The battery management system 120 can receive or retrieve a value of a characteristic of at least one battery module 125 of the battery pack 110, at least one battery cell 130 of the battery pack 110, at least one sensor 135 of the battery pack 110, at least one contactor 140 of the battery pack 110, or at least one high voltage interlock loop (HVIL) 145 of the battery pack 110. The characteristics can be temperatures or voltages of the battery modules 125. The battery modules 125 can include temperature sensors (e.g., negative temperature coefficient (NTC) thermistors, resistance temperature detectors (RTDs), thermocouples) that measure the temperature of the battery modules 125. The battery modules 125 can include voltage sensors (e.g., a capacitive type voltage sensor or a resistive type voltage sensor) that measure the voltage of the battery modules 125.

The battery pack 110 can generate and transmit the data packet 195 to the data processing system 105 when the battery pack 110 is not installed within a vehicle, such as an electric or hybrid vehicle. The battery pack 110 can generate and transmit the data packet 195 to the data processing system 105 when the battery pack 110 is installed within a vehicle. The battery pack 110 can be self-contained. When the battery pack 110 is not installed within a vehicle, there may not be a system that interfaces and communicates with the battery pack 110. The data processing system 105 can allow for interfacing and communicating with the battery pack 110 when the battery pack 110 is not installed within a vehicle (or alternatively when the battery pack 110 is installed within the vehicle).

The characteristics can include sensor measurements of the sensors 135. The sensors 135 can be ammonia (NH3) sensors, carbon monoxide (CO) sensors, pressure sensors, or hydrogen sensors. The sensors 135 can measure a gas level or pressure level within or around an enclosure of the battery pack 110 or within or around enclosures of the battery modules 125. The characteristics can indicate states of the contactor 140. The contactor 140 can switch power provided by the battery modules 125 to various loads (e.g., motors) of an electric or hybrid vehicle that the battery pack 110 can be associated with (e.g., currently installed in, previously installed in, planned to be installed in, or was removed from). The contactor 140 can include electromechanical switches (e.g., solenoids or relays) to switch power to the loads. The characteristics can indicate the states of the contactor 140, e.g., states of the switches of the contactor 140. The characteristics can indicate states of the HVIL 145. The HVIL 145 can perform safety features for an electric or hybrid vehicle that the battery pack 110. The HVIL 145 can generate an alert or code if a high-voltage connection encounters an issue, e.g., breaks, becomes loose, malfunctions. Furthermore, the characteristics can indicate values collected or determined by the battery management system 120, e.g., a time to full charge, a state of charge of the battery pack, or a state of charge of the battery pack 110, individual modules 125, or individual battery cells 130.

The battery management system 120 can encode the characteristics in the data packet 195. For example, the battery management system 120 can generate a frame of data. The battery management system 120 can generate the frame of data to describe a characteristic of the battery pack 110. The battery management system 120 can generate the frame to include or be associated with an identifier. The battery management system 120 can generate the frame of data to describe a value of the characteristic with a particular data type (e.g., signed, unsigned, long). The battery management system 120 include a data processing system such as the example data processing system shown at FIG. 7 to perform the generation, encoding, and transmission of the data packet 195 to the data processing system 105. The battery management system 120 can collect characteristics of the battery pack 110. For example, the battery management system 120 can measure various characteristics via sensors (e.g., temperature sensors, voltage sensors, gas sensors). The battery management system 120 can calculate various characteristics, e.g., monitor a utilization of a battery cell and infer a state of charge. The battery management system 120 can generate the data packets 195 and transmit the data packets via a CAN bus. The battery management system 120 can transmit the data packets 195, via the CAN bus, to the CAN module 115. The battery management system 120 can encode the data packet 195 to include the characteristics of the battery pack 110, e.g., the characteristics of the battery modules 125, the battery cells 130, the sensors 135, the contactor 140, or the HVIL 145. The battery management system 120 can generate the data packet 195 to include multiple frames, each frame including an identifier. The battery management system 120 can write a bit, byte, or hex value to the frames at various positions within the frame to encode the characteristic. The battery management system 120 can perform the encoding based on a set of rules. The set of rules can be specific to a software version run on the battery management system 120. The battery management system 120 can transmit an identifier, e.g., a software identifier, to the data processing system 105 along with the data packet 195 or separate from the data packet 195.

The battery management system 120 can control the battery modules 125. The battery management system 120 can cause the battery modules 125 (or the battery cells 130) to charge or discharge. For example, the battery pack 110 can be connected to an external power source, e.g., a public charging station, a private charging station, a power outlet of a garage or home. The battery management system 120 can cause the battery modules 125 or the battery cells 130 to charge based on power provided by the external power source. The battery management system 120 can cause the battery modules 125 or the battery cells 130 to discharge, e.g., provide power to a motor of an electric vehicle.

The battery pack 110 can transmit an identifier associated with the battery pack 110 to the data processing system 105. The identifier can be included within the data packet 195. The identifier can be transmitted by the battery pack 110 separate from the data packet 195. The identifier can be a software version identifier that identifies a software version run on the battery management system 120. The identifier can be a model identifier identifying a model of the battery pack 110 or the battery management system 120. The identifier can be a stock-keeping unit (SKU) identifying the battery pack 110 or the battery management system 120.

The data processing system 105 can select, based on an identifier associated with the battery pack 110, a decoding scheme associated with the identifier. The data processing system 105 can include a selector 197. The selector 197 can be a software component stored on and executed by the data processing system 105. The selector 197 can select a decoder file from at least one decoder file 150 stored by the data processing system 105. The data processing system 105 can store the decoder files 150 along with an identifier for each of the decoder files 150. For example, the identifier can indicate the software version or product identifier of the battery pack 110 or the battery management system 120 that the decoder file 150 decodes data packets for. Each decoder file 150 can indicate a frame identifier where a particular characteristic can be stored, a start position of data in the frame, an end position of the data in the frame, a unit for the characteristic, a data type of the characteristic, an offset for the characteristic. The selector 197 can select a decoder file from the decoder files 150 based on an identifier associated with the battery pack 110 by looking up the decoder file 150 with the identifier. The selector 197 can receive the identifier via the data packet 195, e.g., the identifier can be included within the data packet 195 (in a header of the data packet 195). The selector 197 can receive the identifier in a separate message received from the battery pack 110. The selector 197 can receive the identifier from at least one display 185 of the data processing system 105. The selector 197 can provide at least one selected decoder file 170 to at least one decoder 160 of the data processing system. The decoder files 150 can be loaded onto the data processing system 105 when the data processing system 105 is provisioned. The decoder files 150 can be loaded onto the system 105 via a secure update when the data processing system 105 is updated.

The decoder files 150 can filter characteristics. For example, some characteristics of the battery pack 110 may be important for assessing health of the battery pack 110. Other characteristics may be less important. The decoder files 150 can identify and decode the characteristics of the data packet 195 that are important and filter out the less important characteristics. This can reduce the amount of data displayed to a user and allow a user to focus on the data indicative of the health of the battery pack 110.

The decoding scheme can identify a type of data located at different frames based on frame identifiers of the data packet 195. For example, the selected decoder file 170 can identify a variable type based on a frame identifier. The data packet 195 can include frame identifiers. In some embodiments, the selector 197 can number the frames and give the frames frame identifiers, e.g., label the first received frame 1, label the second received frame 2, label the third received frame 3, etc. The decoder 160 can identify a type of data located at the frames based on the selected decoder file 170. The decoder 160 can map data values of the frames to at least one user interface 190 based on the selected decoder file 170. For example, a tenth frame can be linked to temperature measurements of a third battery module 125. The decoder 160 can map the temperature value included in the tenth frame into a variable. The decoder 160 can manage or store the variable to represent the temperature of the third battery module 125. The variable can be linked to a user interface element and can be rendered within the user interface 190 based on the relationship between the variable and the user interface element. Rendering the variable can include printing text within the user interface 190, e.g., printing the value with standard base-ten numerals (e.g., 0, 1, 2, 3, 4, 5, 6, 7, 8, 9).

The selector 197 can select a presentation format for the characteristic of the battery pack 110 based on the identifier associated with the battery pack 110. The data processing system 105 can store at least one user interface format 155. Each user interface format 155 can be stored with an identifier, or linked to an identifier, identifying a battery pack 110 that the format 155 displays data for. The formats 155 can define a layout of a user interface. The formats 155 can map values of characteristics of the battery pack 110 to visual indicators or user interface elements of a user interface. Each format can include a particular number of interface elements to display certain characteristics of a particular battery pack 110. For example, one user interface format can include a number of elements displaying characteristics of battery modules. The number of elements can be the same as the number of battery modules 125 of the battery pack 110 (e.g., the same number). For example, for a battery pack 110 with ten battery modules 125, the user interface format can display ten battery module temperature elements for displaying temperature of each of the ten battery modules 125. The formats 155 can each define one or more rules that determine whether values of the characteristics are within various thresholds. For example, the thresholds can indicate that an error has been encountered, e.g., a temperature of the battery module 125 is greater than a predefined threshold or that no error has been encountered, e.g., the temperature of the battery module 125 is less than the predefined threshold. The selector 197 can communicate at least one selected user interface format 165 to at least one user interface generator 175 of the data processing system 105. The user interface formats 155 can be loaded onto the data processing system 105 when the data processing system 105 is provisioned. The user interface formats 155 can be loaded onto the system 105 via a secure update when the data processing system 105 is updated.

The decoder 160 can decode the data packet 195 with a decoding scheme to generate a message. The decoder 160 can decode the data packet 195 with the selected decoder file 170. The decoder 160 can generate at least one decoded battery message 180 based on the data packet 195 and the selected decoder file 170. The decoder 160 can generate messages 180 that represent the characteristic of the data packet 195 in a format that can be displayed in a user interface. For example, the decoder 160 can translate one or more frames of data, e.g., hexadecimal or binary frames, into messages that represent characteristics of the battery pack 110 and values for the characteristics. For example, the decoder 160 can map a frame of data via frame identifiers into messages 180. For example, the decoder 160 can identify a location of a state of charge of the battery pack 110 with a frame identifier of the selected decoder file 170 that indicates where in a set of frames the state of charge appears. Furthermore, the decoder 160 can generate a value for display in a user interface by identifying the data type used to encode the value of the characteristic. The decoder 160 can, based on the indication of the data type, translate the data type from a first data type as included in the data packet 195 into a second data type for display via the user interface. In some cases, the selected decoder file 170 can identify an offset for a value of the characteristic encoded in the data packet 195. For example, the value of the state of charge encoded in the data packet 195 may require an offset before it can be viewed in a display. The decoder 160 can identify the offset and apply the offset to the value of the characteristic in the data packet 195 to generate the decoded battery messages 180.

The decoder 160 can identify a starting position for a value of a characteristic in a frame of the data packet 195, a length of the value, a byte order, a value type, an initial value, a factor, an offset, a minimum value, a maximum value, or a unit based on indications of the selected decoder file 170. The selected decoder file 170 can further indicate the type of characteristic, e.g., identify what frames include state of charge of the battery modules 125, what frames include temperature of the battery modules 125, what frames include values of the sensors 135, what frames include a state of the contactor 140, what frames include states of the HVIL 145. The decoder 160 can apply a factor to the value of the characteristic to generate the decoded battery messages 180. The decoder 160 can confirm that the value of the characteristic is between a minimum and a maximum value. If the value is outside the minimum or maximum value, the decoder 160 can generate a health indicator. The decoder 160 can identify a unit of the value based on the decoder 160. The decoder 160 can identify what bit or byte in a data frame that the value of the characteristic begins based on the selected decoder file 170. The decoder 160 can identify where the data value ends based on a length of the characteristic indicated by the selected decoder file 170.

The user interface generator 175 can cause a computing device to display the message 180 indicating the characteristic of the battery pack 110. The user interface generator 175 can cause the computing device to display multiple messages 180 indicating multiple characteristics of the battery pack 110. For example, the user interface generator 175 can generate a user interface 190 based on the selected user interface format 165 and the decoded battery messages 180. The user interface generator 175 can generate the user interface 190 by placing values of the decoded battery messages 180 into various user interface elements of the selected user interface format 165. For example, because the decoded battery messages 180 are in a format of the data processing system 105, e.g., in a format that identifies data types, characteristic types, battery module numbers, the user interface generator 175 can map the values of the characteristics into locations of the selected user interface format 165. A value of a sensor 135 can be mapped into a particular user interface element for the sensor 135 based on an indication of the sensor 135 included in the decoded battery messages 180 and an indication of the sensor 135 in the selected user interface format 165. The user interface generator 175 can cause a display 185 to display the user interface 190.

The user interface generator 175 can compare values of the decoded battery messages 180 to a threshold to determine a health indicator of the battery pack 110. The user interface generator 175 can compare the values of the decoded battery messages 180 to multiple thresholds. The user interface generator 175 can select a threshold or set of thresholds for a particular type of data (e.g., state of charge of a battery module 125, temperature of a battery module 125, gas level of the sensors 135). The user interface generator 175 can generate user interface elements in the user interface 190 based on the comparison of the value to the thresholds.

For example, the user interface 190 can color code a user interface element, a background of a user interface element, or text data describing the value of the characteristic. For example, the user interface generator 175 can compare a temperature of the battery module 125 to a first threshold. If the temperature is less than the first threshold, the user interface generator 175 can cause a color of the temperature or a related user interface element to be a first color (e.g., magenta). The user interface generator 175 can compare the temperature of the battery module 125 to a second threshold greater than the first threshold. If the temperature is greater than the first threshold but less than the second threshold, the user interface generator 175 can cause the color of the temperature or the related user interface element to be a second color (e.g., blue). If the temperature of the battery module 125 is greater than the second threshold, the user interface generator 175 can cause the color of the temperature or the related user interface element to be a third color (e.g., red).

Responsive to the data processing system 105 being connected to the battery pack 110, the user interface 190 can be displayed on the display 185. The data processing system 105 can decode the data packets 195 and populate the user interface 190 based on the decoding. A user can provide input, via the display 185, to display the user interface 190. Responsive to the request for the user interface 190, the user interface 190 can be displayed. A user may not need to provide any configuration for decoding the data packets or constructing the user interface 190. The user interface 190 may not include any elements from writing data to the battery pack 110 to prevent the battery pack 110 from operating at an incorrect setting. The user interface 190 can include an element for safely adjusting operating settings of the battery pack 110.

Figure 2:
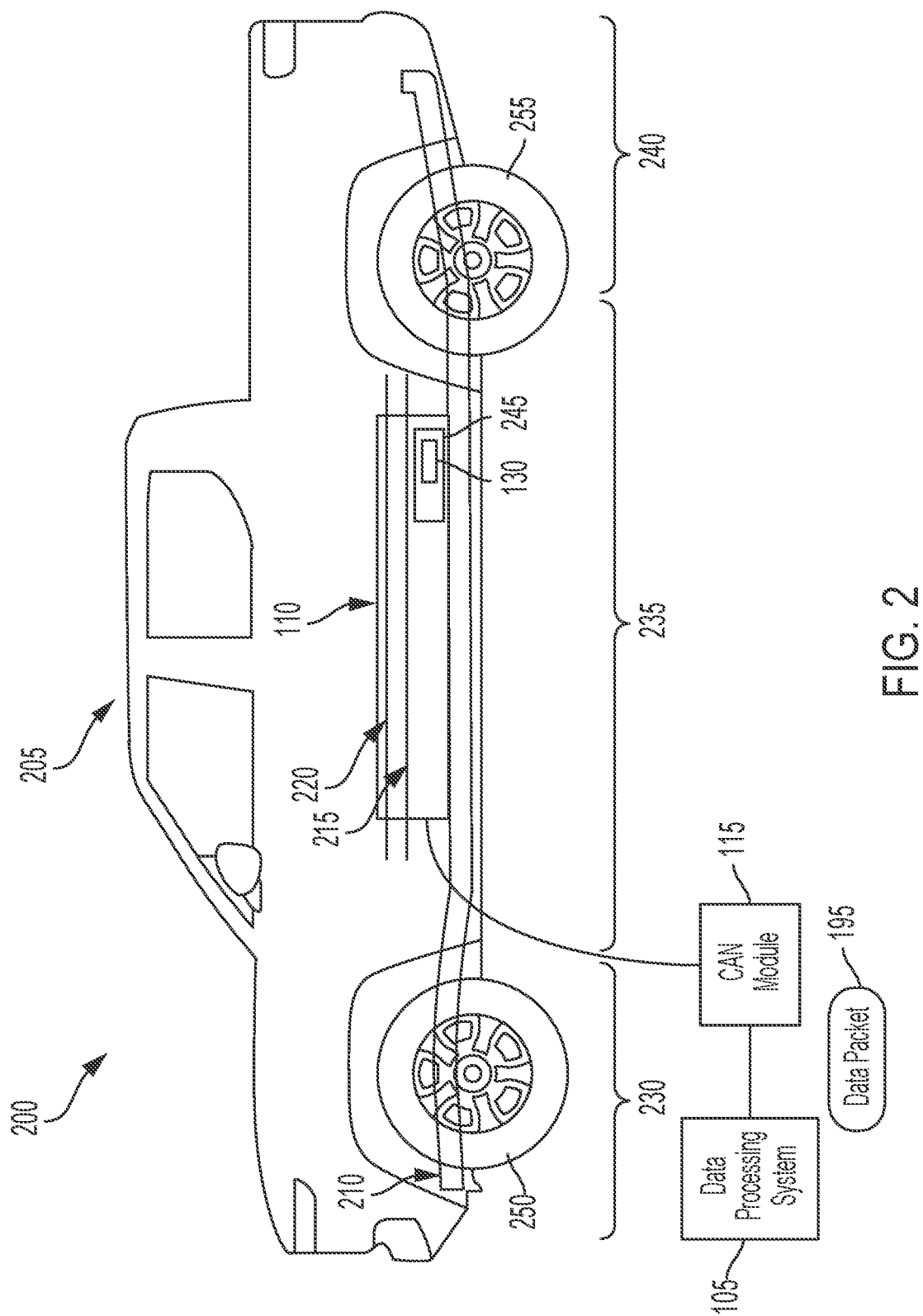
FIG. 2 depicts an example electric vehicle that includes the battery pack.

FIG. 2 depicts is an example cross-sectional view 200 of an electric vehicle 205 installed with at least one battery pack 110. Electric vehicles 205 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can be used as an energy storage system to power a building, such as a residential home or commercial building. Electric vehicles 205 can be fully electric or partially electric (e.g., plug-in hybrid) and further, electric vehicles 205 can be fully autonomous, partially autonomous, or unmanned. Electric vehicles 205 can be human operated or non-autonomous. Electric vehicles 205 such as electric trucks or automobiles can include on-board battery packs 110, battery modules 245, or battery cells 130 to power the electric vehicles. The electric vehicle 205 can include a chassis 210 (e.g., a frame, internal frame, or support structure). The chassis 210 can support various components of the electric vehicle 205. The chassis 210 can span a front portion 230 (e.g., a hood or bonnet portion), a body portion 235, and a rear portion 240 (e.g., a trunk, payload, or boot portion) of the electric vehicle 205. The battery pack 110 can be installed or placed within the electric vehicle 205. For example, the battery pack 110 can be installed on the chassis 210 of the electric vehicle 205 within one or more of the front portion 230, the body portion 235, or the rear portion 240. The battery pack 110 can include or connect with at least one busbar, e.g., a current collector element. For example, the first busbar 220 and the second busbar 215 can include electrically conductive material to connect or otherwise electrically couple the battery modules 245 or the battery cells 130 with other electrical components of the electric vehicle 205 to provide electrical power to various systems or components of the electric vehicle 205.

The electric vehicle 205 can include two front wheels 250 and two rear wheels 255. The electric vehicle 205 can include one or multiple motors. The motors can drive an axel connected to the two front wheels 250 or an axel connected to the two rear wheels 255. A single motor can drive an axel of the two front wheels 250. A single motor can drive an axel of the two rear wheels 255. Each wheel of the wheels 250 and 255 can be driven by an individual motor. For example, each of the four wheels 250 and 255 can be driven by one of four motors. The battery pack 110 can discharge stored energy to power the motors of the front wheels 250 and the rear wheels 255. The battery pack 110 can discharge stored energy to generate power that the motors receive. Operating the motors of the wheels 250 and 255 can cause the electric vehicle 205 to drive forward, reverse, or turn.

The battery pack 110 can be connected to the data processing system 105 while the battery pack 110 is installed within the electric vehicle 205. A technician may be able to connect with the battery pack 110 to view health data of the battery pack via systems of the electric vehicle 205. However, if the systems are not operational or are unavailable, the data processing system 105 can be used to view the health data. The data processing system 105 can connect with a CAN bus of the electric vehicle 205 via the CAN module 115. The data processing system 105 can connect with a CAN bus of the battery pack 110. The CAN module 115 can receive the data packet 195 via the CAN bus and provide the data packet 195 to the data processing system 105.

Figure 3:
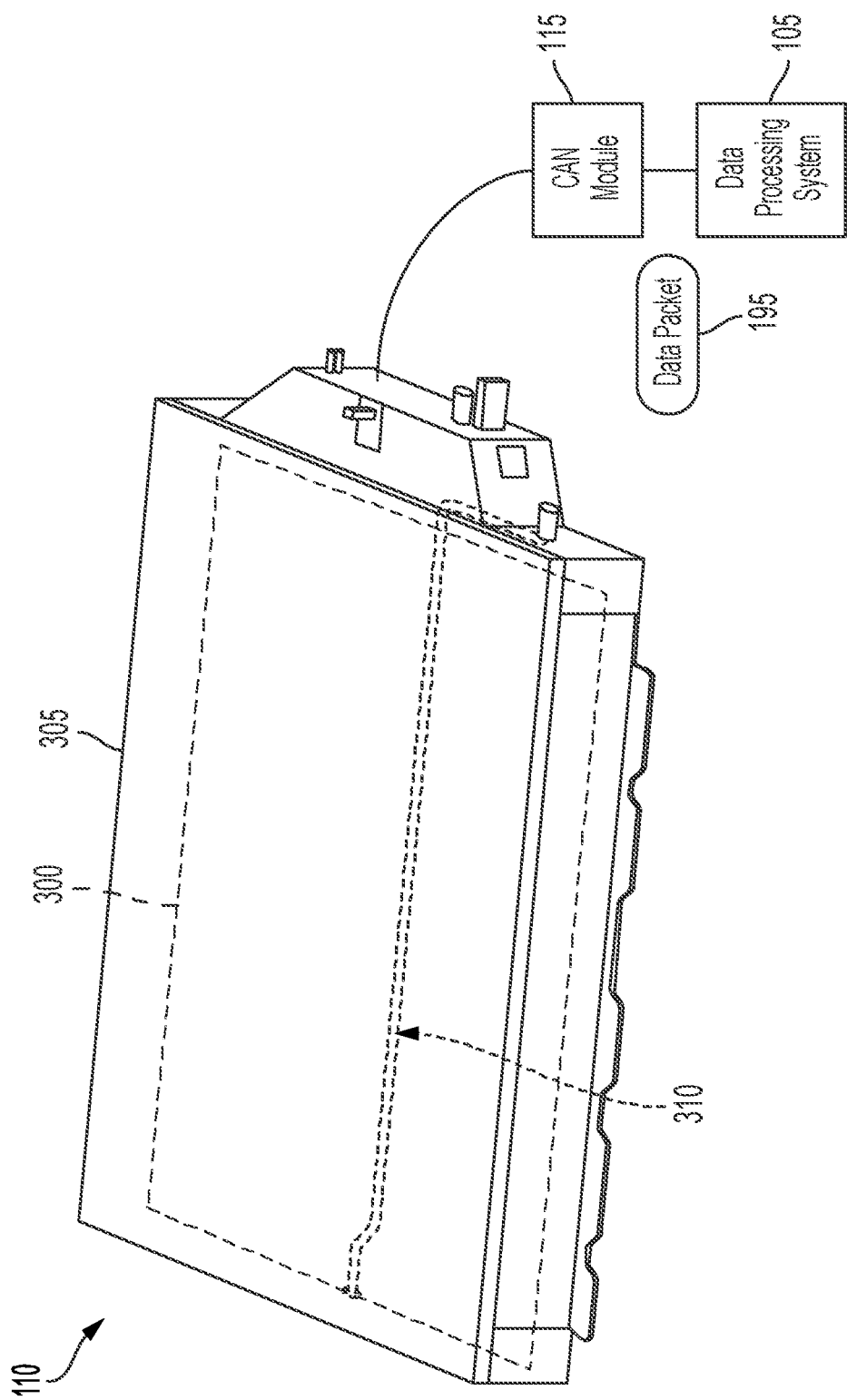
FIG. 3 depicts an example of the battery pack.

FIG. 3 depicts an example of the battery pack 110. Referring to FIG. 3, among others, the battery pack 110 can provide power to electric vehicle 205. Battery packs 110 can include any arrangement or network of electrical, electronic, mechanical or electromechanical devices to power a vehicle of any type, such as the electric vehicle 205. The battery pack 110 can include at least one housing 305. The housing 305 can include at least one battery module 245 or at least one battery cell 130, as well as other battery pack components. The housing 305 can include a shield on the bottom or underneath the battery module 125 to protect the battery module 125 from external conditions, for example if the electric vehicle 205 is driven over rough terrains (e.g., off-road, trenches, rocks, etc.) The battery pack 110 can include at least one cooling line 310 that can distribute fluid through the battery pack 110 as part of a thermal/temperature control or heat exchange system that can include at least one thermal component (e.g., cold plate) 300. The thermal component 300 can be positioned in relation to a top submodule and a bottom submodule, such as in between the top and bottom submodules, among other possibilities. The battery pack 110 can include any number of thermal components 300. For example, there can be one or more thermal components 300 per battery pack 110, or per battery module 245. At least one cooling line 310 can be coupled with, part of, or independent from the thermal component 300.

Figure 4:
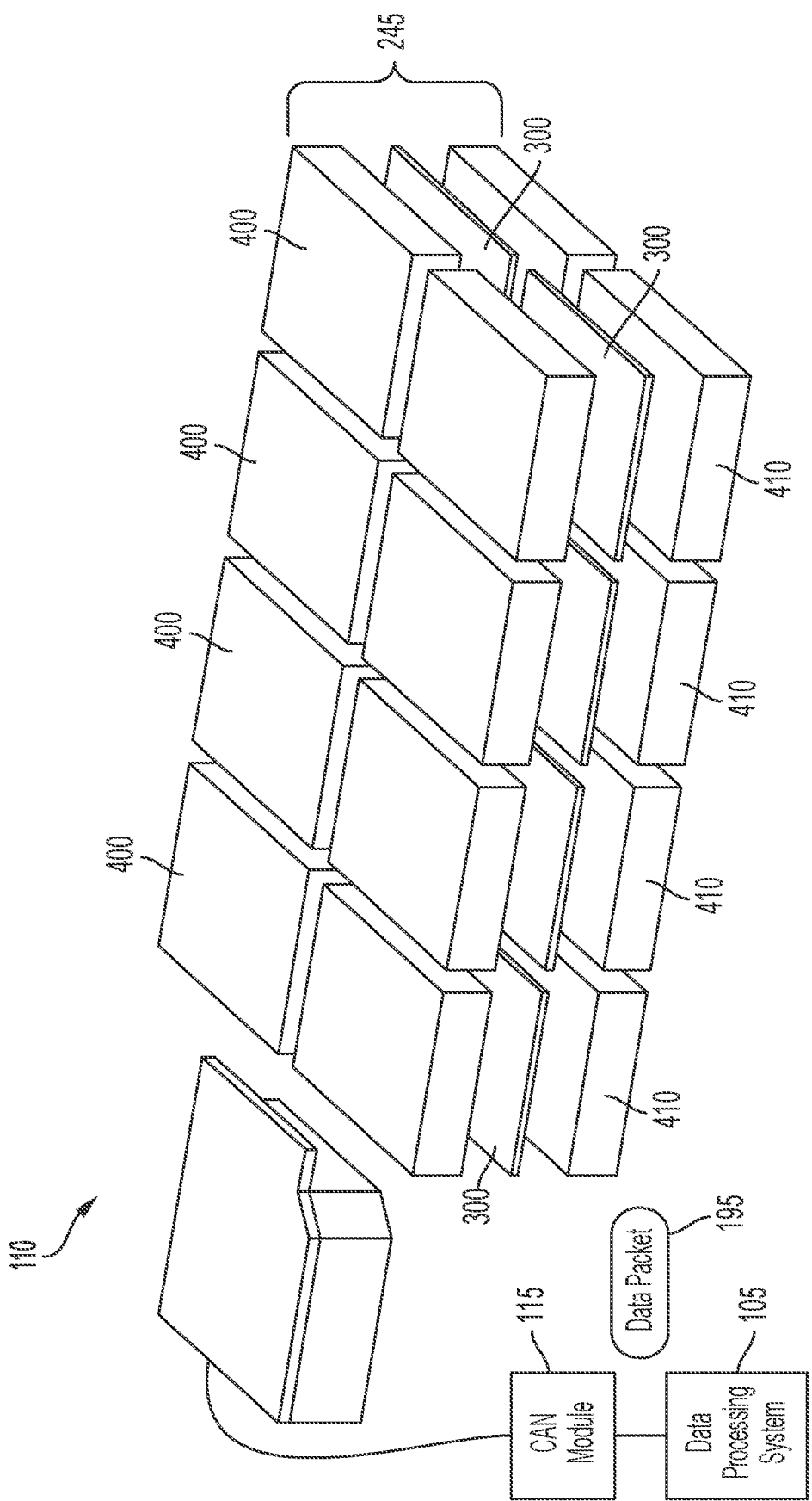
FIG. 4 depicts an example battery module.

The battery pack 110 can be uninstalled from the electric vehicle 205 as shown at FIGS. 3 and 4, among others. For example, during maintenance or service, the battery pack can be removed from the electric vehicle 205. However, because the data processing systems of the electric vehicle 205 may no longer be able to connect with the battery pack 110 and read health data from the data pack 110, a technician can utilize the data processing system 105 to read the health data. The data processing system 105 can be an external tool separate from the data processing systems of the electric vehicle 205. The data processing system 105 can be integrated with the data processing systems of the electric vehicle 205. The CAN module 115 can connect the data processing system 105 with a CAN bus of the battery pack. The CAN module 115 can receive the data packet 195 via the CAN bus and provide the data packet 195 to the data processing system 105.

FIG. 4 depicts example battery modules 245. The battery modules 245 can include at least one submodule. For example, the battery modules 245 can include at least one first (e.g., top) submodule 400 or at least one second (e.g., bottom) submodule 410. At least one thermal component 300 can be disposed between the top submodule 400 and the bottom submodule 410. For example, one thermal component 300 can be configured for heat exchange with one battery module 245. The thermal component 300 can be disposed or thermally coupled between the top submodule 400 and the bottom submodule 410. One thermal component 300 can be thermally coupled with more than one battery module 245 (or more than two submodules 400, 410). The battery submodules 400, 410 can collectively form one battery module 245. In some examples each submodule 400, 410 can be considered as a complete battery module 245, rather than a submodule.

The battery modules 245 can each include a plurality of battery cells. The battery modules 245 can be disposed within the housing 305 of the battery pack 110. The battery modules 245 can include battery cells 130 that are cylindrical cells or prismatic cells, for example. The battery module 115 can operate as a modular unit of battery cells 130. For example, a battery module 245 can collect current or electrical power from the battery cells 130 that are included in the battery module 125 and can provide the current or electrical power as output from the battery pack 110. The battery pack 110 can include any number of battery modules 245. For example, the battery pack can have one, two, three, four, five, six, seven, eight, nine, ten, eleven, twelve or other number of battery modules 245 disposed in the housing 305. Each battery module 245 can include a top submodule 400 and a bottom submodule 410, for example with a thermal component 300 in between the top submodule 400 and the bottom submodule 410. The battery pack 110 can include or define a plurality of areas for positioning of the battery module 245. The battery modules 245 can be square, rectangular, circular, triangular, symmetrical, or asymmetrical. The battery modules 245 can be different shapes, such that some battery modules 245 are rectangular but other battery modules 245 are square shaped, among other possibilities. The battery module 245 can include or define a plurality of slots, holders, or containers for a plurality of battery cells 130.

The battery cells 130 can have a variety of form factors, shapes, or sizes. For example, battery cells 130 can have a cylindrical, rectangular, square, cubic, flat, or prismatic form factor. Battery cells 130 can be assembled, for example, by inserting a wound or stacked electrode roll (e.g., a jelly roll) including electrolyte material into at least one battery cell housing 230. The electrolyte material, e.g., an ionically conductive fluid or other material, can generate or provide electric power for the battery cell 130. A first portion of the electrolyte material can have a first polarity, and a second portion of the electrolyte material can have a second polarity. For example, the battery cell 130 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 130 to separate the anode and cathode from each other and to facilitate transfer of lithium ions between the anode and cathode. The battery cell 130 can be or include a solid state battery cell developed using solid electrodes and solid electrolytes. For example, some battery cells 130 can be solid state battery cells and other battery cells 130 can include liquid electrolytes for lithium-ion battery cells.

Figure 5:
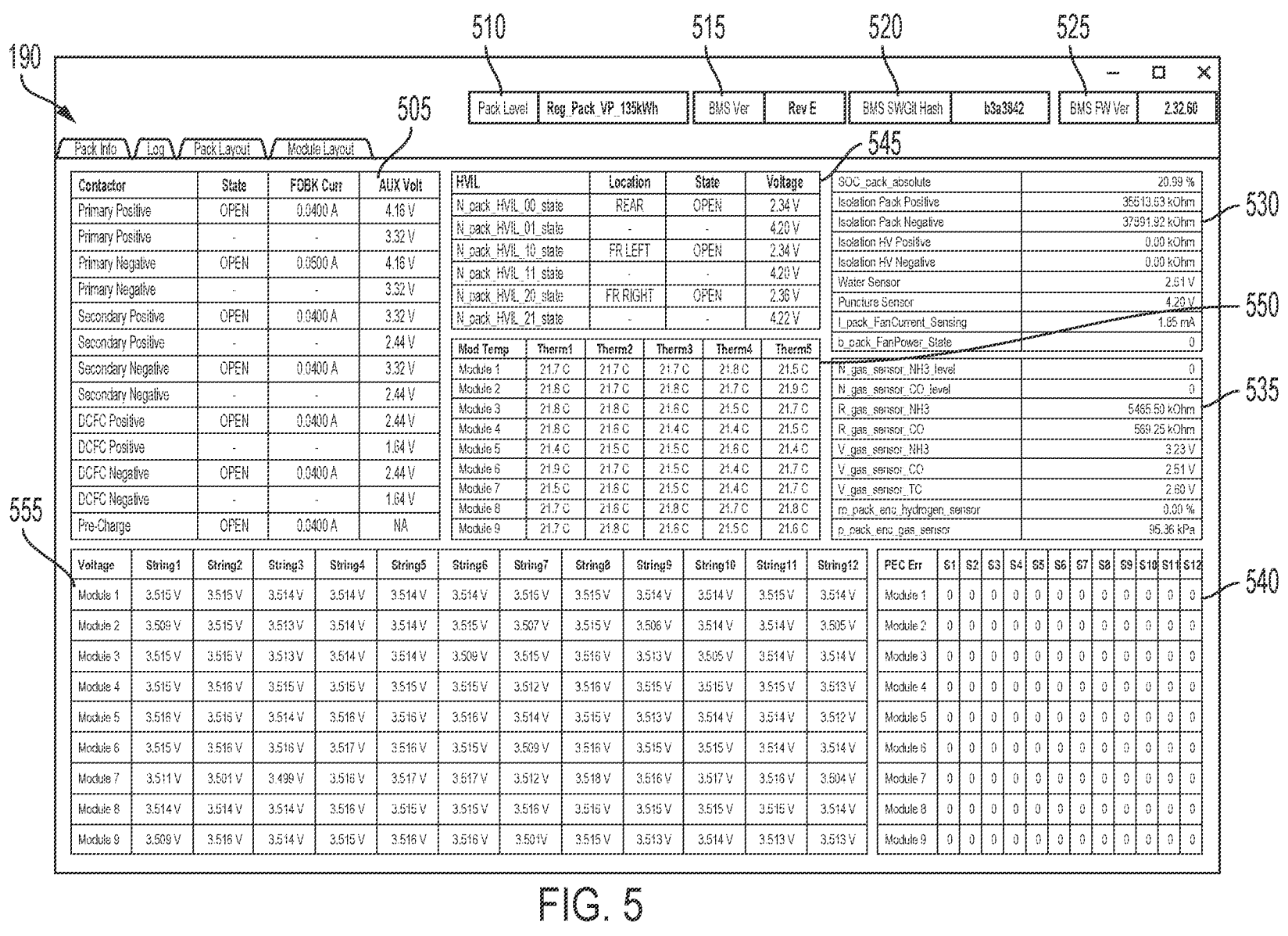

FIG. 5 depicts an example of the user interface 190. The user interface 190 can be generated by the user interface generator 175 and rendered on the display 185. The user interface 190 can display characteristics of the battery pack 110. The characteristics can be values measured by the battery management system 120 or calculated by the battery management system 120. The characteristics of the user interface 190 can include characteristics encoded by the battery management system 120 in the data packet 195 and decoded by the decoder 160. The user interface 190 can further include various identifiers of the battery pack 110.

The user interface 190 can include at least one battery pack level 510 that provides a value indicating an energy level (e.g., kilowatt hour (kWh)) of the battery pack 110. The user interface 190 can include at least one battery management system version identifier 515. The battery management system version identifier 515 can indicate a current version of the battery management system 120. The version can be a manufacturing or product version associated with the battery management system 120. The user interface 190 can include at least one hash value 520. The hash value 520 can be a hash of software, or a portion of software, run by the battery management system 120. The battery management system 120 can generate the hash value 520 by performing a hash (e.g., MD5, SHA-2, or CRC32) on the software or the portion of the software. The user interface 190 can include at least one battery management firmware identifier 525. The battery management firmware identifier 525 can be a software or firmware number identifying a version of software or firmware run by the battery management system 120.

The user interface 190 can include at least one table 505. The table 505 can include characteristics of the contactor 140. The table 505 can include states, currents, and auxiliary voltages associated with primary positive and negative contacts of the contactor 140. The table 505 can include states, currents, and auxiliary voltages of direct current fast charging (DCFC) positive and negative contacts of the contactor 140. The table 505 can include a state, current, and auxiliary voltage of a pre-charge contact of the contactor 140. The user interface 190 can include at least one table 545. The table 545 can include states of HVIL components of the HVIL 145. The states can indicate open or closed states for each HVIL component, a voltage for each HVIL component, and a location associated with each HVIL component.

The user interface 190 can include at least one table 550. The table 550 can include characteristics of the battery modules 125. The table 550 can include cells. A column of the cells can identify the battery modules 125. Other cells of the table 550 can include values of characteristics of the battery modules 125. For example, the table 550 can include temperature values of the battery modules 125. The table 550 can include multiple temperature measurement values for the battery modules 125. For example, in FIG. 5, five temperature measurements of five temperature sensors are shown. The temperature measurements can be color coded in the table 550 to provide health indicators. For example, if the temperatures are less than a particular temperature threshold, the temperature values can be colored a particular color (e.g., magenta). If the temperatures are greater than the particular temperature threshold but less than a second temperature threshold, the temperature values can be colored another color (e.g., blue). If the temperatures are greater than the second temperature threshold, the temperature values can be colored a third color (e.g., red).

The user interface 190 includes at least one table 530 of characteristics of the battery pack 110. The table 530 can include an absolute state of charge (SOC) of the battery pack 110. The table 530 can include an isolation pack positive contact resistance value and an isolation pack negative contact resistance value. The table 530 can include an isolation high voltage (HV) positive contact resistance value and an isolation HV negative contact resistance value. The table 530 can include a measurement (e.g., a voltage measurement) of a water sensor of the battery pack 110. The table 530 can include a measurement (e.g., a voltage measurement) of a puncture sensor of the battery pack 110. The table 530 can include a current consumed by a fan of the battery pack 110. The table 530 can include a fan power state of the fan of the battery pack 110.

The user interface 190 can include at least one table 535. The table 535 can include measurements of the sensors 135. The measurements can include measurements of levels of ammonia (NH3), carbon monoxide (CO), or hydrogen. The measurements can include a measurement of a pressure of an enclosure gas of the battery pack 110. The table 535 can include the measurements in units of moles (N), sensor resistances (ohms), sensor voltages (volts), percentages, or Pascals. The user interface 190 includes at least one table 555. The table 555 includes multiple cells identifying the modules 125. The table 555 includes multiple cells identifying the modules 125. For example, a column of the table 555 can represent the modules 125. Furthermore, the table 555 can include a row representing battery cells 130 of the modules 125. The cells of the table 555 can include voltage measurements of each battery cell 130 of each module 125. The table 555 can include health indicators of the modules 125 and battery cells 130. The health indicators can be a color coding of the text of the table 555. The color coding can be magenta, blue, or red. The user interface generator 175 can cause a voltage value to be magenta if the voltage value is less than a first predefined voltage threshold. The user interface generator 175 can cause a voltage value to be blue if the voltage value is greater than the first predefined voltage threshold and less than a second predefined voltage threshold. The user interface generator 175 can cause a voltage value to be red if the voltage value is greater than the second predefined voltage threshold.

The user interface 190 can include at least one table 540. The table 540 can indicate communication characteristics of the battery modules 125 or the battery cells 130. The table 540 can indicate packet-error checking (PEC) statuses. The PEC status can indicate whether a communication error has occurred when communicating with the battery modules 125 or the battery cells 130. The PEC status can indicate a zero when there is no error and indicate a one when there is an error. The table 540 can list the battery modules 125 as a column. The table 540 can include a row identifying the battery cells 130. The user interface generator 175 can generate health indicators for the table 540. The health indicators can be color coding the text of the cells of the table 540. For a battery cell 130 of a module 125 experiencing a communication error, the user interface generator 175 can color the cell red and color the text of the cell black. For a battery cell 130 of a module 125 not experiencing a communication error, the user interface generator 175 can color the cell white and color the text of the cell green.

Figure 6:
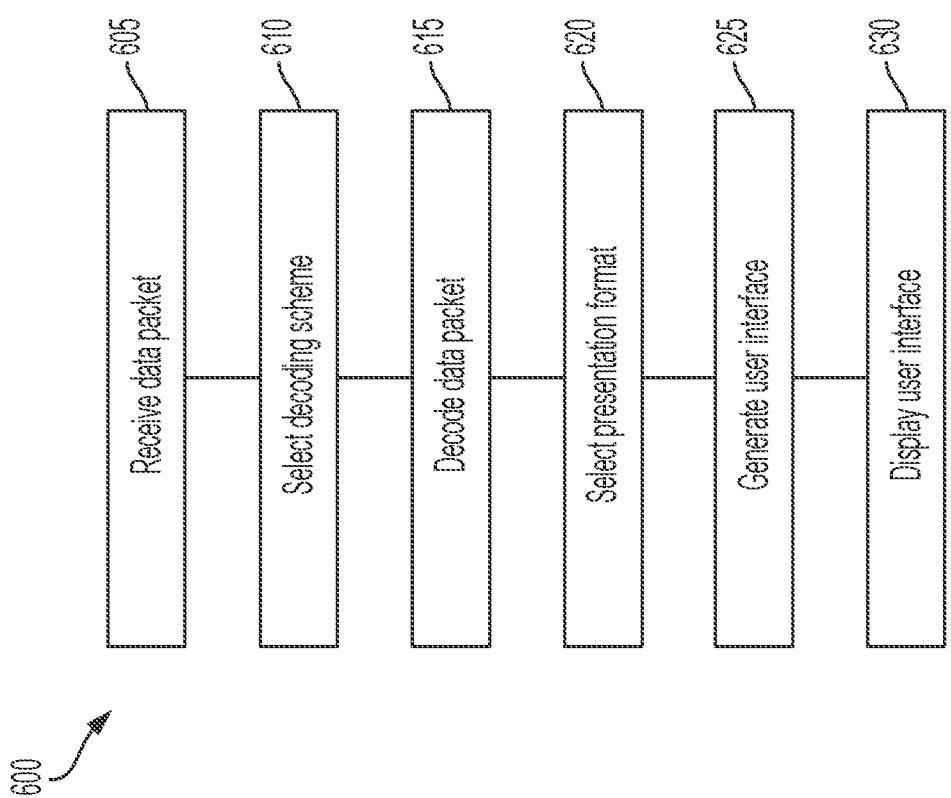
FIG. 6 depicts an example flow diagram of a method of decoding a data packet of a battery pack.

FIG. 6 is a flow diagram of an example method 600 of decoding a data packet of a battery pack. The method 600 can be performed by one or more systems or components of the data processing system 105 described at FIGS. 1-5. The method 600 can be performed by a computing system of the electric vehicle 205, or any other type of vehicle. The method 600 can include any one or more ACTS 605-630. The ACTS 605-630 can be performed in various orders. ACT 605 receives a data packet. ACT 610 selects a decoding scheme. ACT 615 decodes a data packet. ACT 620 selects a presentation format. ACT 625 generates a user interface. ACT 630 displays as user interface.

At ACT 605, the method 600 can include a data processing system (e.g., the data processing system 105) receiving a data packet (e.g., the data packet 195). The data processing system can receive the data packet from the battery pack 110. The data packet can include one or multiple characteristics of the battery pack 110. A battery management system (e.g., the battery management system 120) can collect the characteristics. The battery management system can generate the data packet by encoding the characteristics as values of the data packet. The battery management system can transmit the data packet to the data processing system. The battery management system can transmit the data packet to the data processing system via a CAN bus. The data processing system can receive the data packet from the battery management system. The data processing system can receive the data packet from the battery management system via the CAN bus. The data processing system 105 can receive the data packet via a CAN module (e.g., the CAN module 115) that interfaces with the CAN bus. The battery management system can transmit an identifier to the data processing system. The identifier can identify a model of the battery pack, a model of the battery management system, a software or firmware version of the battery management system. The data processing system can receive the identifier from the battery management system.

At ACT 610, the method 600 can include a data processing system (e.g., the data processing system 105) selecting a decoding scheme. For example, the data processing system can select a decoder file (e.g., the decoder file 170) from a set of decoder files (e.g., the decoder files 150). One or more of the decoder files 150 can be linked to an identifier. A selector (e.g., the selector 197) can select the decoder file from the group of decoder files based on an identifier associated with the battery pack 110 or the battery management system 120. The identifier can be the identifier received at ACT 605. The selector can select the decoder file from the set of decoder files by identifying the decoder file linked to the identifier.

At ACT 615, the method 600 can include a data processing system (e.g., the data processing system 105) decoding a data packet (e.g., the data packet 195). The data processing system can decode the data packet based on the decoding scheme. For example, the data processing system can decode the data packet with the selected decoding file (e.g., the selected decoder file 170) selected at ACT 610. A decoder (e.g., the decoder 160) of the data processing system can decode the data packet to generate messages (e.g., the decoded battery messages 180). The decoder 160 can map data values of the data packet to messages. The decoder 160 can map data values of the data packet to various variables. The decoder file can indicate the location of data elements in the data packet. The decoder file can indicate a frame identifier of a frame of the data packet and indicate an associated data variable. The decoder can save a value retrieved from the frame into the data variable based on the decoder file.

At ACT 620, the method 600 can include a data processing system (e.g., the data processing system 105) selecting a presentation format. The data processing system can select a user interface format (e.g., the user interface format 165) from a set of user interface formats (e.g., the user interface formats 155). The user interface formats of the set of user interface formats can each be linked to an identifier. The identifier can identify a model of the battery pack, a model of the battery management system, a software or firmware version of the battery management system. The data processing system can select the user interface format by identifying the user interface format linked to the identifier. The selected user interface format can include user interface elements that correspond to a set of characteristics of a battery pack (e.g., the battery pack 110). For example, for a battery pack 110 with ten battery modules and each of the ten modules including 15 battery cells, the user interface format can include a table with ten rows and fifteen columns to include characteristic values of each of the battery cells. Because the format of the user interface presentation is prebuilt and selected based on the identifier, the user interface can be created and quickly with low latency responsive to a request for the user interface.

At ACT 625, the method 600 can include a data processing system (e.g., the data processing system 105) generating a user interface (e.g., the user interface 190). The data processing system can generate the user interface by populating a selected user interface format (e.g., the selected user interface format 165) selected at ACT 620. The data processing system can map decoded battery messages (e.g., the decoded battery messages 180) into the selected user interface format to generate the user interface. The decoding performed by a decoder (e.g., the decoder 160) of the data processing system 105 can map characteristics of a data packet (e.g., the data packet 195) into the selected user interface format. For example, the decoded battery messages can include variables. Each variable can store a value for a characteristic. Each variable can be mapped into the user interface format.

At ACT 630, the method 600 can include a data processing system (e.g., the data processing system 105) displaying a user interface. The data processing system can cause a computing system to display the user interface. For example, the data processing system can cause a display (e.g., the display 185) to display the user interface. The data processing system can render the user interface generated at ACT 625 on the display. For example, the data processing system can operate pixels (e.g., light emitting diodes) of the display to be various colors to render the user interface.

Figure 7:
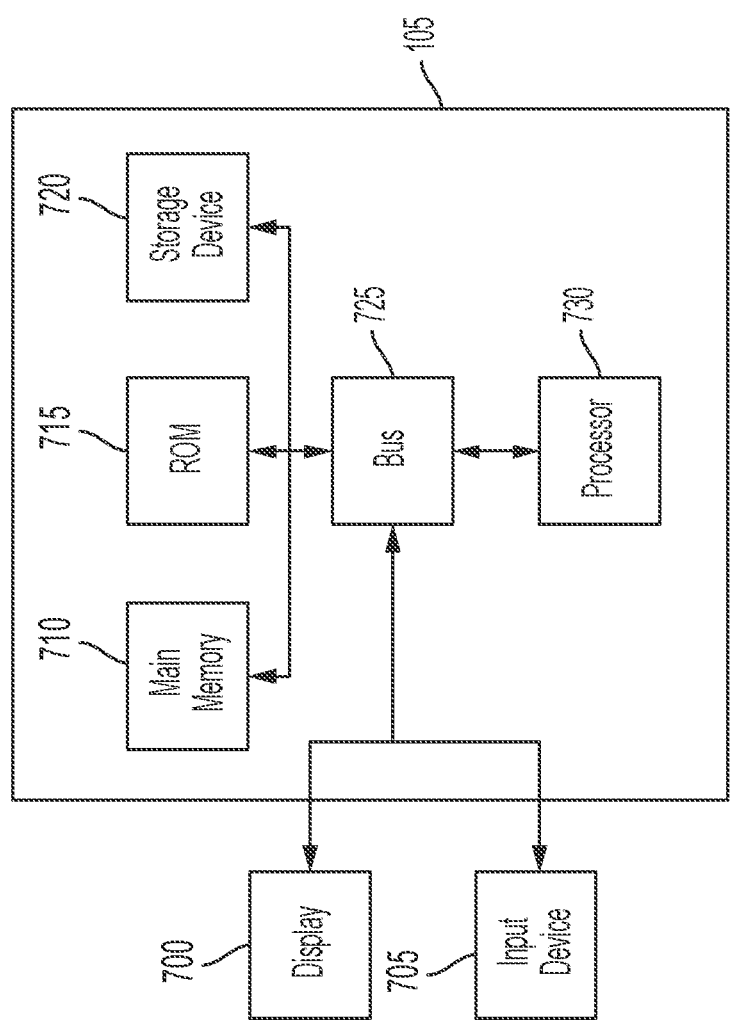
FIG. 7 is a block diagram illustrating an architecture for a computer system that can be employed to implement elements of the systems and methods described and illustrated herein.

FIG. 7 depicts an example block diagram of the data processing system 105. The data processing system 105 can include or be used to implement a data processing system or its components. The data processing system 105 can include at least one bus 725 or other communication component for communicating information and at least one processor 730 or processing circuit coupled to the bus 725 for processing information. The data processing system 105 can include one or more processors 730 or processing circuits coupled to the bus for processing information. The data processing system 105 can include at least one main memory 710, such as a random access memory (RAM) or other dynamic storage device, coupled to the bus 725 for storing information, and instructions to be executed by the processor 730. The main memory 710 can be used for storing information during execution of instructions by the processor 730. The data processing system 105 can further include at least one read only memory (ROM) 715 or other static storage device coupled to the bus 725 for storing static information and instructions for the processor 730. A storage device 720, such as a solid state device, magnetic disk or optical disk, can be coupled to the bus 725 to persistently store information and instructions.

The data processing system 105 can be coupled via the bus 725 to a display 700, such as a liquid crystal display, or active matrix display, for displaying information to a user such as a driver of the electric vehicle 205 or other end user. An input device 705, such as a keyboard or voice interface can be coupled to the bus 725 for communicating information and commands to the processor 730. The input device 705 can include a touch screen display 700. The input device 705 can include a cursor control, such as a mouse, a trackball, or cursor direction keys, for communicating direction information and command selections to the processor 730 and for controlling cursor movement on the display 700.

The processes, systems and methods described herein can be implemented by the data processing system 105 in response to the processor 730 executing an arrangement of instructions contained in main memory 710. Such instructions can be read into main memory 710 from another computer-readable medium, such as the storage device 720. Execution of the arrangement of instructions contained in main memory 710 causes the data processing system 105 to perform the illustrative processes described herein. One or more processors in a multi-processing arrangement can be employed to execute the instructions contained in main memory 710. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. For example, the data processing system described herein can be separate from an electric vehicle or battery pack. For example, the data processing system described herein could be a component of the electric vehicle located within the electric vehicle. For example, the data processing system described herein could be a component of the battery pack of the electric vehicle. One or more components of the data processing system could be located within the electric vehicle, within the battery pack, outside the battery pack, or outside the electric vehicle. One or more components of the data processing system could be distributed across devices located within the electric vehicle or outside the electric vehicle. For example, the data processing system could have a display located remote from decoding components of the data processing system. For example, a mobile application of a smartphone could display the user interface generated by the data processing system based on decoding data packets received from the battery pack. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a data processing system comprising one or more processors, coupled to memory, to:
receive a data packet associated with a battery pack, the data packet indicating a characteristic of the battery pack;
select, based on an identifier associated with the battery pack, a decoding scheme associated with the identifier from a plurality of decoding schemes, the plurality of decoding schemes associated with a plurality of different identifiers;
decode the data packet with the decoding scheme to generate a message; and
cause a computing device to display the message indicating the characteristic of the battery pack.

2. The system of claim 1, comprising the characteristic of the battery pack including at least one of:
a voltage of a battery module of the battery pack;
a temperature of the battery module of the battery pack;
a state of a contactor of the battery pack;
a state of charge of the battery pack;
a gas sensor measurement of a gas sensor of the battery pack; and
a state of a high voltage interlock loop of the battery pack.

3. The system of claim 1, wherein the battery pack is associated with an electric vehicle.

4. The system of claim 1, comprising the data processing system to:
receive a software identifier from a battery management system; and
select the decoding scheme based on the software identifier of the battery management system.

5. The system of claim 1, wherein:
the decoding scheme identifies a type of data located at a plurality of different frames based on frame identifiers of the data packet; and
the decoding scheme maps data values of the plurality of different frames to a user interface based on the decoding scheme.

6. The system of claim 1, comprising:
a controller area network circuit configured to communicate over a controller area network bus with the battery pack.

7. The system of claim 1, comprising the data processing system to:
compare the characteristic of the battery pack to a threshold to determine a health indicator of the battery pack.

8. The system of claim 1, comprising the data processing system to:
select, based on the identifier associated with the battery pack, a presentation format for the characteristic of the battery pack; and
generate a user interface based on the presentation format and the characteristic of the battery pack.

9. The system of claim 1, comprising:
a battery contactor to switch power to a plurality of loads of a vehicle, wherein the characteristic describes a characteristic of the battery contactor.

10. The system of claim 1, comprising:
a high voltage interlock loop to perform one or more safety features for a vehicle, wherein the characteristic describes a characteristic of the high voltage interlock loop.

11. The system of claim 1, comprising:
a user interface including a table comprising a plurality of cells that include identifiers of a plurality of battery modules of the battery pack; and
wherein the plurality of cells include values of characteristics of the plurality of battery modules;
the system comprising the data processing system to:
compare the values of the characteristics of the plurality of battery modules to a level; and
cause the plurality of cells, or the values displayed in the plurality of cells, to be a particular color based on the comparison.

12. The system of claim 11, wherein the characteristics of the plurality of battery modules include at least one of temperature measurements of the plurality of battery modules, and voltage measurements of the plurality of battery modules.

13. A method, comprising:
receiving, by a data processing system comprising one or more processors coupled to memory, a data packet associated with a battery pack, the data packet indicating a characteristic of the battery pack;
selecting, by the data processing system, based on an identifier associated with the battery pack, a decoding scheme associated with the identifier, wherein:
the decoding scheme identifies a type of data located at a plurality of different frames based on frame identifiers of the data packet; and
the decoding scheme maps data values of the plurality of different frames to a user interface;
decoding, by the data processing system, the data packet with the decoding scheme to generate a message; and
causing, by the data processing system, a computing device to display the message indicating the characteristic of the battery pack.

14. The method of claim 13, comprising:
selecting, by the data processing system, based on the identifier associated with the battery pack, the decoding scheme from a plurality of decoding schemes, the plurality of decoding schemes associated with a plurality of different identifiers.

15. The method of claim 13, comprising:
receiving a software identifier from a battery management system; and
selecting the decoding scheme based on the software identifier.

16. The method of claim 13, comprising:
selecting, by the data processing system, based on the identifier associated with the battery pack, a presentation format for the characteristic of the battery pack; and
generating, by the data processing system, a user interface based on the presentation format and the characteristic of the battery pack.

17. The method of claim 13, comprising:
causing, by the data processing system, the display of the computing device to display a user interface including the message;
the user interface comprising:
a table comprising a plurality of cells, wherein one of a row or a column includes identifiers of a plurality of battery modules of the battery pack; and
wherein the plurality of cells include values of characteristics of the plurality of battery modules.

18. A system, comprising:
a data processing system comprising one or more processors, coupled to memory, to:
receive a data packet associated with a battery pack, the data packet indicating a characteristic of the battery pack;
select, based on an identifier associated with the battery pack, a decoding scheme associated with the identifier;
decode the data packet with the decoding scheme to generate a message;
select, based on the identifier associated with the battery pack, a presentation format for the characteristic of the battery pack;
generate a user interface based on the presentation format and the characteristic of the battery pack; and
cause a computing device to display the user interface.

19. The system of claim 18, comprising:
a battery cell; and
a battery management system to:
encode the data packet indicating the characteristic of the battery cell; and
transmit the data packet and the identifier, the identifier associated with the battery management system, to the data processing system.

20. The system of claim 18, comprising:
a plurality of battery cells to charge via an external power source and discharge power to a motor of a vehicle;
a battery management system to cause the plurality of battery cells to charge and discharge; and the characteristic of the battery pack indicates a condition of the plurality of battery cells.

* * * * *